US008359833B2

(12) United States Patent
Nalla et al.

(10) Patent No.: US 8,359,833 B2
(45) Date of Patent: Jan. 29, 2013

(54) METHOD FOR INTRODUCING A REDUCTANT INTO AN EXHAUST STREAM

(75) Inventors: Purna Chander Nalla, Peoria, IL (US);
Amit Jayachandran, Peoria, IL (US);
James Mutti, Germantown Hills, IL (US); Baoyong Liu, Dunlap, IL (US);
Ethan D. Sanborn, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 484 days.

(21) Appl. No.: 12/645,558

(22) Filed: Dec. 23, 2009

(65) Prior Publication Data
US 2011/0146247 A1   Jun. 23, 2011

(51) Int. Cl.
*F01N 3/00* (2006.01)

(52) U.S. Cl. ............... 60/286; 60/274; 60/292; 60/295; 60/301; 60/303

(58) Field of Classification Search ............. 60/274, 60/286, 292, 293, 295, 297, 301, 303
See application file for complete search history.

(56) References Cited

U.S. PATENT DOCUMENTS

| | | | |
|---|---|---|---|
| 4,987,738 A | 1/1991 | Lopez-Crevillen et al. | |
| 5,809,775 A | 9/1998 | Tarabulski et al. | |
| 5,884,475 A | 3/1999 | Hofmann et al. | |
| 6,021,639 A * | 2/2000 | Abe et al. ................. | 60/297 |
| 6,363,771 B1 | 4/2002 | Liang et al. | |
| 6,470,673 B1 * | 10/2002 | van Nieuwstadt et al. .... | 60/274 |
| 6,625,975 B1 | 9/2003 | Stahl et al. | |
| 6,845,611 B2 | 1/2005 | Huthwohl et al. | |
| 7,373,775 B2 | 5/2008 | Breuer et al. | |
| 7,685,810 B2 * | 3/2010 | Hirata et al. ................. | 60/277 |
| 8,015,801 B2 * | 9/2011 | Oberski et al. ............... | 60/286 |
| 8,112,985 B2 * | 2/2012 | Uhrich et al. ................. | 60/284 |
| 8,132,405 B2 * | 3/2012 | Katou et al. ................. | 60/301 |
| 8,161,735 B2 * | 4/2012 | Kitazawa ..................... | 60/295 |
| 2006/0086079 A1 | 4/2006 | Kaefer et al. | |
| 2007/0084193 A1 | 4/2007 | Levin | |
| 2007/0163238 A1 | 7/2007 | Gerlach | |
| 2007/0180816 A1 | 8/2007 | Masuda et al. | |
| 2007/0251226 A1 | 11/2007 | Kaneko | |
| 2008/0014103 A1 | 1/2008 | Cooke | |
| 2008/0022654 A1 | 1/2008 | Broderick et al. | |
| 2008/0022659 A1 | 1/2008 | Viola et al. | |
| 2008/0022663 A1 | 1/2008 | Dodge et al. | |
| 2008/0034733 A1 | 2/2008 | Miller et al. | |

FOREIGN PATENT DOCUMENTS

| | | |
|---|---|---|
| JP | 2005248924 | 9/2005 |
| WO | 2008001598 | 1/2008 |

* cited by examiner

*Primary Examiner* — Binh Q Tran
(74) *Attorney, Agent, or Firm* — Miller, Mathias & Hull

(57) ABSTRACT

A method of introducing reductant to an exhaust stream is disclosed. The method may include ordering a first dosing event, supplying a reductant to a dispensing device in response to ordering the first dosing event, dispensing reductant from the dispensing device into the exhaust stream, and forcing reductant from the dispensing device toward a reductant source, wherein sufficient reductant remains in a pumping device and a fluid passage to keep the pumping device primed.

20 Claims, 5 Drawing Sheets

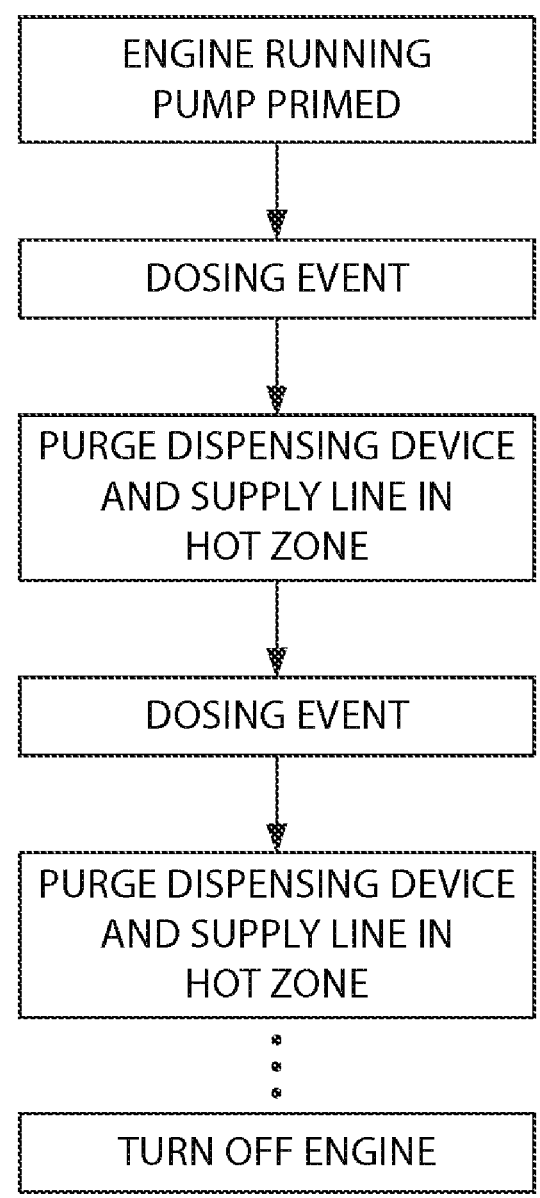

METHOD FOR INTRODUCING A REDUCTANT INTO AN EXHAUST STREAM

TECHNICAL FIELD

The present disclosure is directed an exhaust system including to reductant dosing system. In particular, the present disclosure is directed to a method for purging the reductant dosing system.

BACKGROUND

Selective Catalytic Reduction (SCR) systems provide a method for removing nitrogen oxide (NOx) emissions from fossil fuel powered systems. During SCR, a catalyst facilitates a reaction between a reductant, such as urea, and NOx to produce water and nitrogen gas, thereby removing NOx from the exhaust gas. Generally, the reductant is mixed with the exhaust upstream of the SCR catalyst.

Reductant dosing systems may be used to introduce the reductant, such as urea, into the exhaust stream. For example, urea may be mixed with water and stored in a tank. As the power system operates and produces exhaust, the urea mixture is pumped from the tank and intermittently sprayed into the exhaust stream via a nozzle.

A challenge to urea dosing systems relates to the relatively high ambient temperature at which urea mixtures may freezes (i.e. about −11° C.). As urea freezes, it expands in the dosing system and can cause damage to intricate components such as injector nozzles. Additionally, when exposed to elevated temperatures, urea can decompose and form a deposit that can clog dosing components.

U.S. Published Patent Application No. 2007/0163238 (hereinafter the '238 application), by Gerlach, discloses a method of purging a dosing system of urea. The '238 application discloses using pressurized air to purge urea from a metering valve and reagent pump when the engine is shutdown and a threat of freezing exists.

While the method disclosed in the '238 application may address the issue of urea freezing in a dosing system, it may fail to address the issue of urea decomposing at elevated temperatures while the engine is running. Such as the potential for urea that remains in a nozzle between injections to decompose and form a deposit.

The present disclosure is directed to overcoming one or more of the shortcomings in the existing technology.

SUMMARY OF THE DISCLOSURE

In one aspect, the present disclosure is directed toward a method of introducing reductant to an exhaust stream. The method may include ordering a first dosing event, supplying a reductant to a dispensing device in response to ordering the first dosing event, dispensing reductant from the dispensing device into the exhaust stream, and forcing reductant from the dispensing device toward a reductant source, wherein sufficient reductant remains in a pumping device and a fluid passage to keep the pumping device primed.

According to another aspect, the present disclosure is also directed toward a method of purging a dosing system. The method may include supplying reductant from a pumping device to a dispensing device via a first fluid passage, the length of the first fluid passage from the pumping device to the dispensing device being a first length, spraying reductant from the dispensing device into the exhaust stream, forcing reductant from the dispensing device along the first fluid passage toward the pumping device, and discontinuing forcing reductant along the first fluid passage when reductant from the dispensing device is a second length along the first fluid passage that is less than the first length.

According to another aspect, the present disclosure is directed toward a reductant dosing system. The reductant dosing system may have a control system configured to purge reductant from a dispensing device along a first fluid passage toward a pumping device with pressurized gas from a pressurized gas source while maintaining sufficient reductant in the pumping device to keep the pumping device primed. The control system may purge reductant between the dispensing device intermittently dispensing reductant into an exhaust system of the engine

BRIEF DESCRIPTION OF THE DRAWINGS

In the accompanying drawings, which are incorporated in and constitute a part of this specification, exemplary embodiments of the disclosure are illustrated, which, together with the written description, serve to explain the principles of the disclosed system:

FIG. 5 is a flow chart for an exemplary disclosed dosing method.

DETAILED DESCRIPTION

Figure 1:
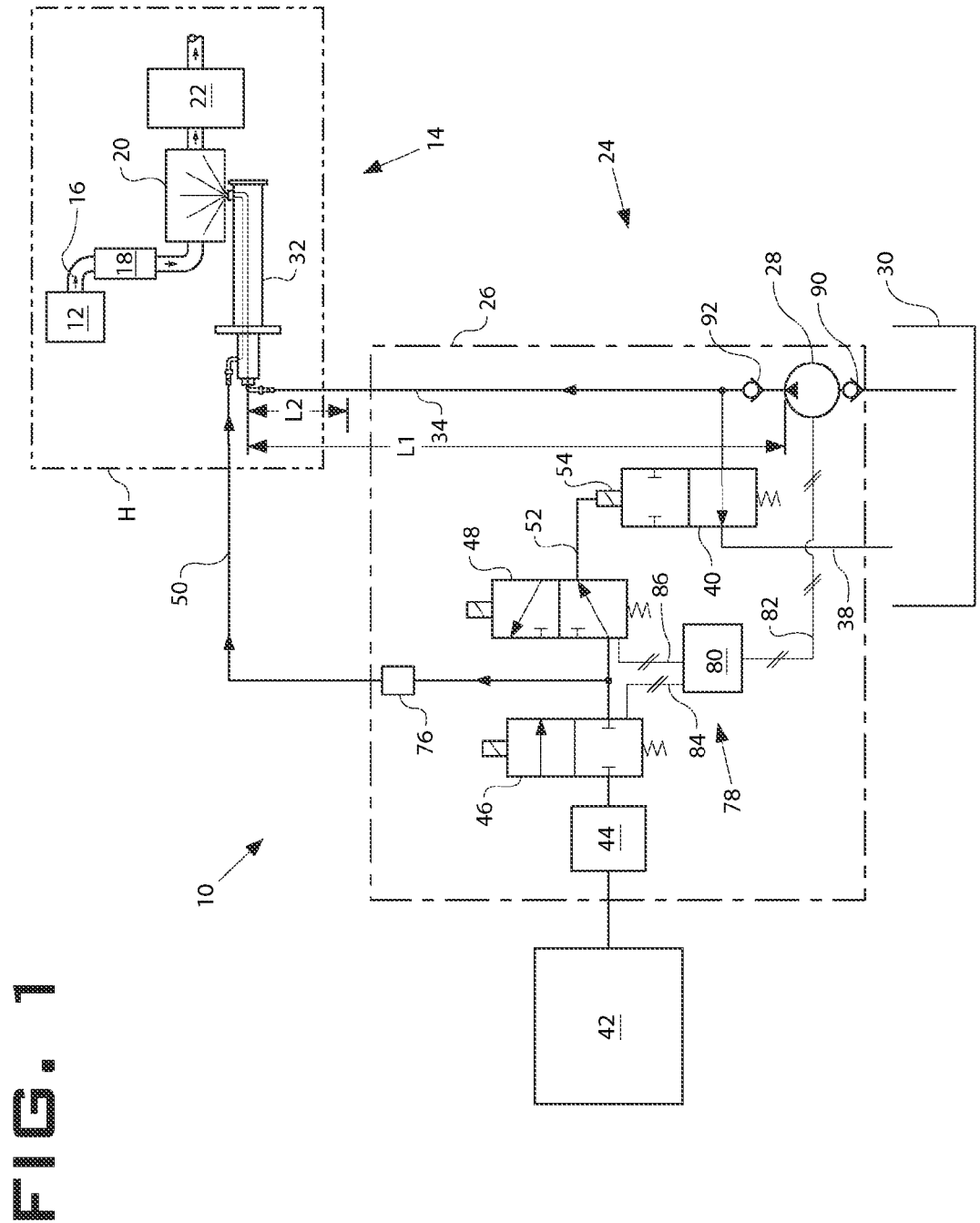
FIG. 1 is a first schematic illustration of an exemplary disclosed power system.
Figure 2:
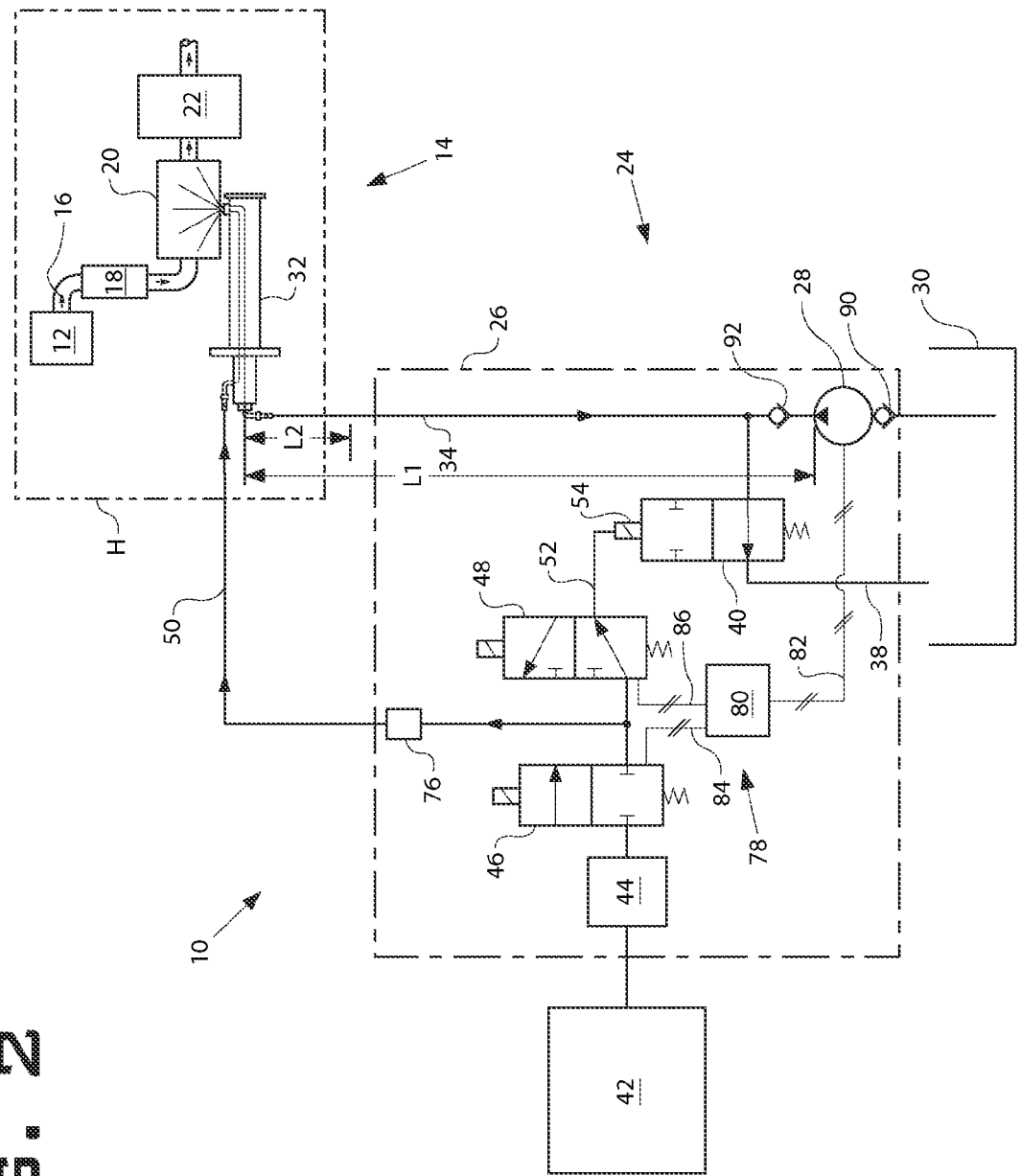
FIG. 2 is a second schematic illustration of the power system.

Referring to FIGS. 1 and 2, an exemplary power system 10 is disclosed. The power system 10 includes an engine 12 and an exhaust system 14. The engine 12 includes features not shown, such as fuel systems, air systems, cooling systems, peripheries, drivetrain components, turbochargers, etc. The engine 12 may be any type of engine (internal combustion, turbine, gas, diesel, gaseous fuel, natural gas, propane, etc.), may be of any size, with any number of cylinders, and in any configuration ("V," in-line, radial, etc.). The engine 12 may be used to power any machine or other device, including locomotive applications, on-highway trucks or vehicles, off-highway trucks or machines, earth moving equipment, generators, aerospace applications, marine applications, pumps, stationary equipment, or other engine powered applications.

The exhaust system 14 includes one or more exhaust aftertreatment devices designed to reduce undesirable emissions from an exhaust stream 16 of the engine 12. The exhaust aftertreatment devices may include a variety of emissions treatment technology, including, but not limited to, regeneration devices, heat sources, oxidation catalysts, diesel oxidation catalysts (DOCs), diesel particulate filters (DPFs), selective catalytic reduction catalysts (SCRs), lean NOx traps (LNTs), mufflers, or other devices needed to treat the exhaust stream 16 exiting the engine 12.

In the depicted embodiment, the exhaust system 14 includes an oxidation catalyst system 18, a mixer assembly 20, and an SCR assembly 22. The oxidation catalyst system 18 may be configured in a variety of ways and contain catalyst materials useful in collecting, absorbing, adsorbing, and/or converting hydrocarbons, carbon monoxide, and/or oxides of nitrogen contained in the exhaust. Such catalyst materials may include, for example, aluminum, platinum, palladium, rhodium, barium, cerium, and/or alkali metals, alkaline-earth metals, rare-earth metals, or combinations thereof.

The SCR assembly 22 may include any suitable SCR catalyst, such as a vanadium and titanium-type, a platinum-type, or a zeolite-type SCR catalyst, and may include a honeycomb substrate or other structure containing one or more of these metals and configured to assist in reducing NOx. The mixer assembly 20 is configured to mix the reductant with the exhaust stream 16 after the reductant has been introduced into the exhaust stream 16 and prior to introducing the mixture into the SCR assembly 22. The mixer assembly 20 includes structures that enhance disruption of the mixture and/or provide adequate time for the exhaust and reductant to sufficiently mix. The structures may include orifices, deflectors, swirlers, baffles, or any other suitable structure that enhances mixing.

A dosing system 24 is associated with the exhaust system 14 to supply reductant to the exhaust stream 16. The dosing system 24 may be located partially or entirely within a housing 26, such as a cabinet for holding dosing equipment. The dosing system 24 includes a pumping device 28, a reductant source 30, and a dispensing device 32.

The reductant source 30 may be, for example, a low pressure tank for storing a reductant solution. Reductant source 30 may be remotely located from the housing 26 or may be integrated onto or within the housing 26. The reductant may be, for example, an aqueous urea solution or other fluid suitable for use as a reductant in SCR.

A first fluid passage 34 fluidly couples the reductant source 30 to the dispensing device 32. The first fluid passage 34 has a length L1 corresponding to the passage length from the dispensing device 32 to pumping device 28.

The pumping device 28 is situated and configured to transfer reductant through the first fluid passage 34 from the reductant source 30 to the dispensing device 32 for introduction into the exhaust stream 16. The pumping device 28 may be any suitable device capable of delivering reductant from the reductant source 30 to the dispensing device 32. For example, the pumping device 28 may be a metering pump such as, for example, a diaphragm pump. The pumping device 28 may be driven independently of the engine 12 such as, for example, by an electric motor, or driven by the engine 12.

The dosing system 24 may include a bypass passage 38. The bypass passage 38 fluidly connects the reductant source 30 to the first fluid passage 34 at a location between the pumping device 28 and the dispensing device 32. A first valve 40 is associated with the bypass passage 38. The first valve 40 may be any suitable valve capable of selectively allowing or blocking flow through the bypass passage 38. In the depicted embodiment, the first valve 40 is a pneumatically actuated, spring-biased control valve that is movable between a first position and a second position. The first valve 40 selectively allows flow through the bypass passage 38 in a first position and selectively blocks flow through the bypass passage 38 in a second position.

The dosing system 24 includes a pressurized gas source 42, a pressure regulator 44, a second valve 46, and a third valve 48. A second fluid passage 50 fluidly couples the pressurized gas source 42 to the dispensing device 32 and a third fluid passage 52 fluidly couples the pressurized gas source 42 to a control port 54 on the first valve 40.

The pressurized gas source 42 may be remotely located from the housing 26 or integrated on or within the housing 26. The pressurized gas source 42 may include a pump and/or a pressurized container containing a pressurized gas such as air. Pressurized gas may be combined with the reductant at the dispensing device 32 to improve atomization of the reductant.

The pressure regulator 44 is positioned to mechanically regulate the pressure of the gas within the second fluid passage 50. The pressure regulator 44 may maintain an appropriate pressure near the pressurized gas source 42 so that, after pressure losses, an appropriate pressure is maintained at the dispensing device 32 to assist reductant injection.

The second valve 46 is positioned to selectively fluidly couple the pressurized gas source 42 to the dispensing device 32 via the second fluid passage 50. The second valve 46 may be any suitable valve, such as, for example, a solenoid-actuated and spring-biased control valve that is movable between a first position and a second position. The second valve 46 selectively allows flow through the second fluid passage 50 in a first position and selectively blocks flow through second fluid passage 50 in a second position.

The third valve 48 is positioned to selectively fluidly couple the pressurized gas source 42 to the control port 54 on the first valve 40 via the third fluid passage 52. The third valve 48 may be any suitable valve, such as, for example, a solenoid-actuated and spring-biased directional control valve with three ports that is movable between a first position and a second position. The third valve 48 fluidly couples the control port 54 to atmosphere in the first position and fluidly couples the pressurized gas source 42 to the control port 54 in the second position. Thus, in the depicted embodiment, when the third valve 48 is in the first position, any pressurized gas at the control port 54 and in the third fluid passage 52 is vented to atmosphere allowing the first valve 40 to open. When the third valve 48 is in the second position, pressurized gas from the pressurized gas source acts as a pneumatic control signal to force close the first valve 40. In another embodiment, the third valve 48 may be omitted and the first valve may be actuated from another source. For example, the first valve 40 may be a solenoid-actuated.

Figure 3:
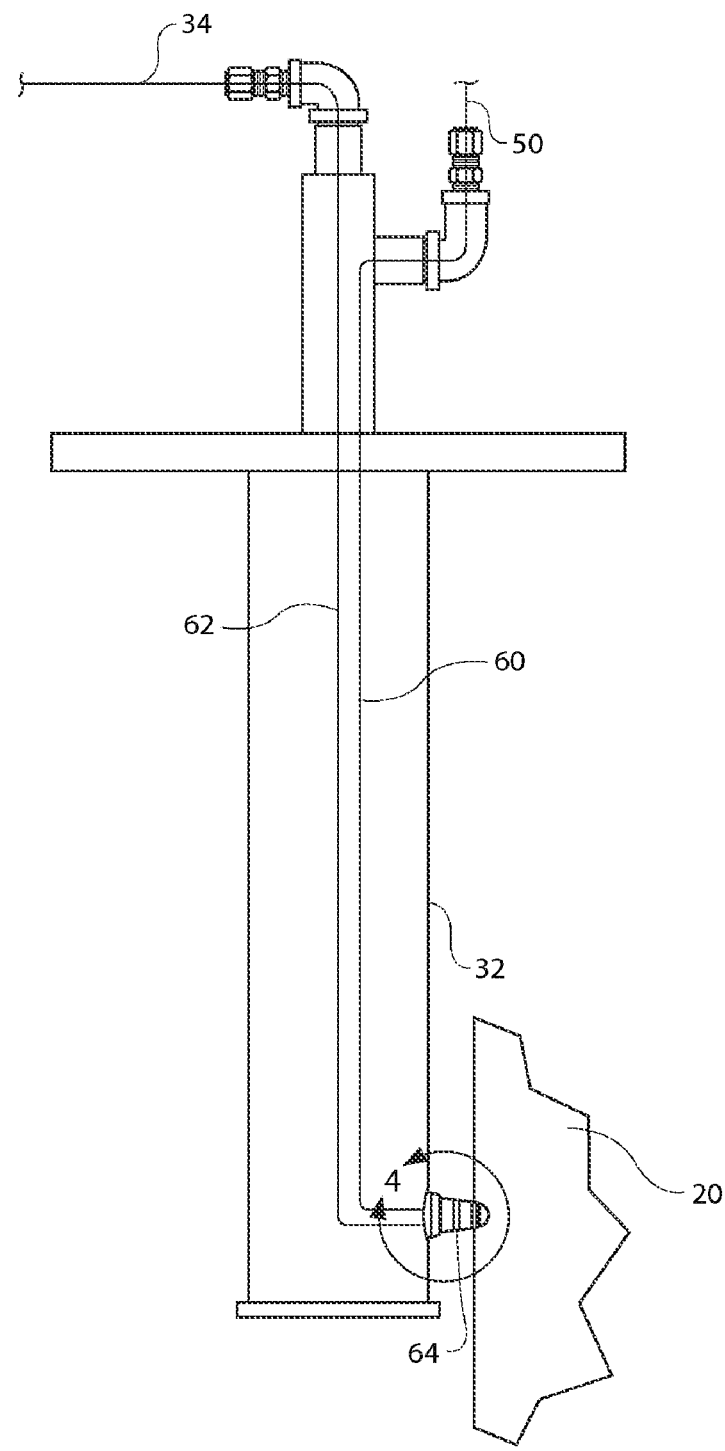
FIG. 3 is a schematic illustration of an exemplary disclosed dispensing device of the dosing system of FIG. 1.

The dispensing device 32 may be any suitable device capable of introducing reductant into the exhaust stream 16. Referring to FIG. 3, the dispensing device 32 includes a first passageway 60, a second passageway 62, and a nozzle 64. The first passageway 60 fluidly connects to the second fluid passage 50 to allow pressurized gas into the nozzle 64. The second passageway 62 fluidly connects to the first fluid passage 34 to allow reductant solution into the nozzle 64. The nozzle 64 is disposed adjacent to or at least partially within the mixer assembly 20. Thus, a portion of the nozzle 64 is exposed to the exhaust stream 16.

Figure 4:
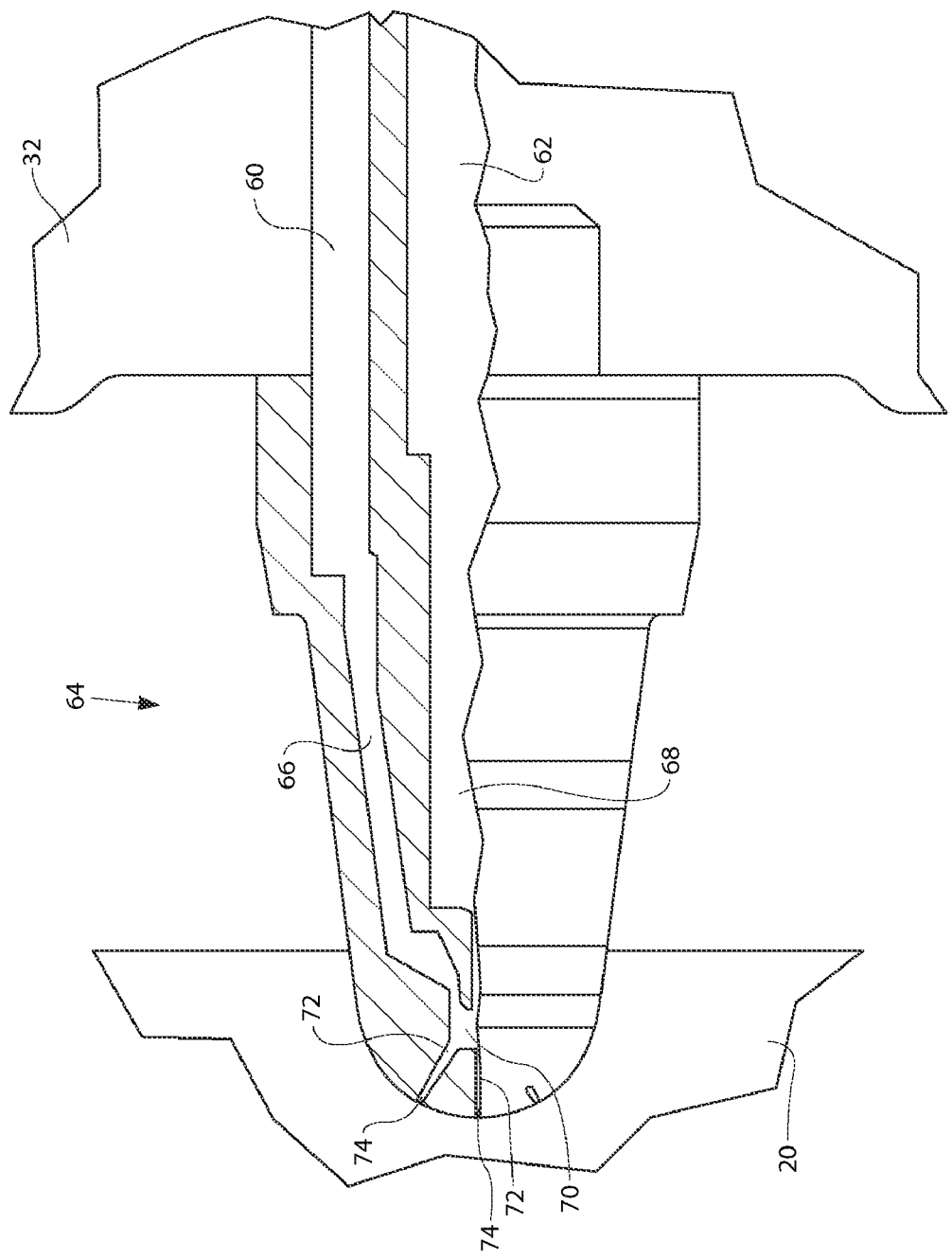
FIG. 4 is a cross section of an exemplary disclosed nozzle of the dispensing device of FIG. 3.

Referring to FIG. 4, the nozzle 64 includes a first nozzle passage 66 that fluidly connects to the first passageway 60 and a second nozzle passage 68 that fluidly connects to the second passageway 62. The first nozzle passage 66 and the second nozzle passage 68 are fluidly connected via a chamber 70. Thus, pressurized gas from the first nozzle passage 66 and pressurized reductant solution from the second nozzle passage 68 combine in the chamber 70.

The chamber 70 includes one or more injection passageways 72 that are fluidly connected to the mixer assembly 20 via a plurality of orifices 74. The orifices 74 may have relatively small areas that provide a pressure restriction to flow. The combined pressurized gas and the pressurized reductant in the chamber 70 may have sufficient pressure to overcome the pressure restriction (pressure differential). Thus, the pressurized gas and pressurized reductant may flow through orifices 74 and spray into the mixer assembly 20.

Referring to FIGS. 1 and 2, the power system 10 also includes a gas pressure sensor 76 and a control system 78. The control system 78 includes one or more controller(s) 80 that control and monitor various portions of the engine 12, exhaust system 14, and dosing system 24. The controller(s) 80 may be any type of programmable logic controller(s) known in the art for automating machine processes such as, for example, an engine control unit (ECU). The control system 78 may have a single controller that controls and monitors the engine 12, the exhaust system 14, and the dosing system 24, or multiple controllers. For example, the controller(s) 80 may control an operation of the pumping device 28 via an electrical line 82, the operation of the second valve 46 via electrical line 84, and the operation of the third valve 48 via electrical line 86. The controller(s) 80 may also be connected to other components of the power system 10 via electrical lines (not shown), such as, for example, the engine 12, an operator station (not shown), and the exhaust system 14. For example, the controller(s) 80 may be electrically connected to a temperature sensor and an emissions sensor (e.g. NOx sensor) disposed within exhaust system 14. The controller(s) 80 may monitor the amount of NOx in the exhaust stream at one or more locations, such as, for example, downstream of the SCR assembly 22. The emissions sensor may send a signal to the controller(s) 80 and the controller(s) may control the dosing system 24 to (i) initiate a dosing event in which the dosing system injects reductant into the exhaust stream 16, (ii) discontinue dosing, or (iii) change the duration or frequency of intermittent dosing events (e.g. change the length of each injection or the amount of time between injections).

In addition, the controller(s) 80 may also receive a signal from the temperature sensor indicative of exhaust temperature. The controller(s) 80 may initiate a dosing event when a temperature within the exhaust system 14 exceeds a threshold temperature, for example, about 180° C. and above, at which selective catalytic reduction may occur. When the exhaust temperature exceeds the threshold temperature, the temperature sensor disposed in the exhaust system signals the controller(s) 80.

The gas pressure sensor 76 is disposed within second fluid passage 50 and is electrically connected to the controller(s) 80 via an electrical line 88. The gas pressure sensor 76 provides a signal indicative of a gas pressure in the second fluid passage 50 to the controller(s) 80 as input. When the signal from the gas pressure sensor 76 is indicative of an amount of gas pressure that is unsuitable for proper operation of the dosing system 24, the controller(s) 80 controls, via an electrical line 86, the second valve 46 to move from the first position to the second position, thereby blocking the flow of pressurized gas through second fluid passage 50. Moving the second valve 46 to the first position also disconnects the pressurized gas source 42 from the control port 45 on the first valve 40. Thus, the first valve 40 moves to the second position to allow fluid in the first fluid passage to return to the reductant source 30.

The dosing system 24 may also, optionally, include a first check valve 90 positioned in first fluid passage 34 between the reductant source 30 and the pumping device 28 and a second check valve 92 positioned in the first fluid passage 34 between the pumping device 28 and the bypass passage 38.

INDUSTRIAL APPLICABILITY

The disclosed dosing system may be used in any system that delivers fluid to an exhaust system to reduce exhaust emissions such as, for example, a locomotive or a generator. The disclosed dosing system may be used to affect selective catalytic reduction within any machine having an exhaust system, including locomotive applications, on-highway trucks or vehicles, off-highway trucks or machines, earth moving equipment, generators, aerospace applications, marine applications, pumps, stationary equipment, or other engine powered applications.

As shown in FIGS. 1-3, the dispensing device 32 is adjacent the exhaust stream 16. When the engine is operating, especially at non-idle conditions, the heat from the exhaust stream 16 creates a hot zone H. The hot zone H refers to the area within which the temperature can exceed a predetermined threshold temperature during engine operation. The threshold temperature is the temperature at which urea will crystallize or decompose and form a deposit. In FIGS. 1 and 2, for illustrative purposes, the hot zone H is depicted to encompass the exhaust system 14, the dispensing device 32, and a portion of the first fluid passage 34. The hot zone H, however, may encompass more or less than illustrated in the figures. For example, the hot zone H may only encompass a portion of the dispensing device 32.

The controller(s) 80 controls the dosing system 24 to intermittently inject reductant (i.e. intermittent dosing events) into the exhaust stream 16 in order to facilitate SCR. The frequency of injections can vary depending on a variety of factors, such as but not limited to, the operating conditions of the engine, the temperature of the exhaust, the efficiency of the SCR assembly at reducing NOx, the concentration of reductant, and other factors. In between intermittent dosing events, any reductant that remains in the hot zone (at the nozzle for example) may decompose and form deposits. To reduce or eliminate deposit formation, the dosing system 24 purges reductant from the hot zone in between intermittent dosing events.

FIG. 5 provides a method for operating the dosing system 24. The steps described occur when the engine 12 is running and producing exhaust and the pumping device 28 is primed and prepared to deliver reductant to the dispensing device 32. Since many pumping devices do not pump air well, priming a pumping device means to fill the pumping device with the desired working fluid (e.g. reductant) to expel air from the pumping device. A non-primed pumping device may not effectively pump the working fluid, while a primed pumping device may be able to deliver working fluid when demanded.

In step 300, the control system 78 orders a dosing event. For example, the controller(s) 80 receives signals indicative of exhaust temperature and NOx in the exhaust stream 16 and determine that reductant is needed in the SCR process. In response, the control system 78 controls the dosing system 24 to execute a dosing event or execute multiple intermittent dosing events at a certain frequency. For example, the control system 78 activates the pumping device 28 and actuates one or more valves.

In step 310, the dosing system 24 executes a first dosing event in which the system injects reductant into the exhaust stream 16. Referring to FIG. 1, during a dosing event, the pumping device 28 is activated, the first valve 40 is placed in the first position to block flow through the bypass passage 38, the second valve 46 is placed in the first position to allow pressurized gas flow through the second fluid passage 50, and the third valve 48 is placed in the second position to fluidly couple the pressurized gas source 42 to the control port 54 on the first valve 40.

The pumping device 28 draws reductant from the reductant source 30 and transfers the reductant, under pressure, to the dispensing device 32 via the first fluid passage 34. In addition, the pressurized gas source 42 transfers pressurized gas to the dispensing device 32 via the second fluid passage 50. As illustrated in FIG. 3, the pressurized gas and the pressurized reductant enter the dispensing device 32 via the first passageway 60 and the second passageway 62, respectively, and flow toward the nozzle 64. As illustrated in FIG. 4, the pressurized gas and the pressurized reductant flow via the first nozzle passage 66 and the second nozzle passage 68, respectively, and mix in chamber 70. The pressure of the gas and reductant within the chamber 70 may exceed the pressure restriction of the orifices 74, causing the mixture of reductant and air to spray into exhaust system 14 via orifices 74.

Purging reductant from the hot zone occurs in step 315. In the depicted embodiment, reductant is purged from the dispensing device and a portion of the first fluid passage 34 (i.e. the supply line). In other embodiments, the reductant may only need to be purged from the dispensing device or a portion thereof. Referring to FIG. 2, during a hot zone purge event, the pumping device 28 is off, the first valve 40 is placed in the first position to fluidly couple the reductant source 30 to the first fluid passage 34 via the bypass passage 38, the second valve 46 is placed in the first position to allow pressurized gas flow through the second fluid passage 50, and the third valve 48 is placed in the first position to fluidly couple the control port 54 on the first valve 40 to atmosphere via the third fluid passage 52.

The pressurized gas source 42 transfers pressurized gas to the dispensing device 32 via the second fluid passage 50. As illustrated in FIG. 3, the pressurized gas enters the dispensing device 32 via the first passageway 60 and flows toward the nozzle 64. As illustrated in FIG. 4, the pressurized gas further flows via the first nozzle passage 66 and into the chamber 70. Because the pumping device 28 is not operating at this time, the second nozzle passage 68 offers less resistance to flow than the pressure restriction of the orifices 74. Pressurized air thus flows into second nozzle passage 68 and flows out of dispensing device 32 via the second passageway 62. The flow of pressurized gas will then urge the remaining reductant out of dispensing device 32.

The mixture of reductant and pressurized air is urged through the first fluid passage 34 a length L2 back toward the reductant source 30. The length L2 corresponds to a distance along the first fluid passage 34 prior to the pumping device 28 (i.e. L2 is less than L1) but far enough that the reductant that was remaining in the dispensing device 32 and the first fluid passage 34 proximate to the dispensing device 32 is out of the hot zone H. Reductant is thereby purged from the dispensing device 32 in a direction that is opposite to a direction of reductant flow during dosing.

Reductant in the first fluid passage 34 closer to the pumping device 28 is forced along the bypass passage 38 since it is configured to provide less flow resistance than through the stopped pumping device 28.

Once the mixture of the remaining reductant and pressurized gas has been purged clear of the hot zone H, but before the pumping device is purged, the purging step 315 is stopped. The trigger to stop the purging step 315 may be based on a predetermined time interval, may be based on controlling the pressure of the pressurized gas to ensure the pump is not purged, may be based on a request by the controller(s) 80 to initiate a subsequent dosing event, or may be based on some other factor, such as volume of reductant returned to the reductant source.

To stop purging, the second valve 46 remains in the first position in which pressurized gas flows through the second fluid passage 50 to the dispensing device 32. At the same time, the third valve 48 is placed in the second position. As a result, the first valve 40 will change from the first position to the second position and block fluid flow through the bypass passage 38. Since the first valve 40 is closed and the second check valve 92 prevents fluid flow through the pumping device 28, further purging of fluid is prevented and the pressurized gas delivered to the dispensing device 32 by the pressurized gas source 42 will exit the injection passageways 72 into the mixer assembly 20. Alternatively, to stop purging, the second valve 46 may be placed in the second position to stop the flow of pressurized gas to the dispensing device 32.

In step 314, the dosing system 24 executes a subsequent dosing event in which the system injects reductant into the exhaust stream 16. The subsequent dosing event step 314 is operationally the same as the first dosing event step 310, though the duration of the dosing event(s) may be different.

While the engine is operating (such as at non-idle operating conditions) and SCR is desired, the dosing system 24 repeats the pattern of a dosing event followed by a purging of the reductant from the hot zone. In this way, during the period between dosing events, the reductant in the system is not exposed to elevated temperatures that may lead to decomposition and deposit formation. Furthermore, the purging of the system does not result in the pumping device 28 being purged of reductant. Thus, the pumping device 28 remains primed and able to quickly supply reductant to the dispensing device 32 on demand. The intermittent purging events also consume less compressed gas than if the entire system was purged back to the reductant source 30.

Though the method of FIG. 5 describes a purging event between every two dosing events, one of ordinary skill in the art will understand that the purging events may occur less frequently, such as after multiple consecutive dosing events.

It will be apparent to those skilled in the art that various modifications and variations can be made to the disclosed dosing system. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A method for introducing reductant to an exhaust stream of an engine, comprising:
    ordering a first dosing event;
    supplying a reductant to a dispensing device in response to ordering the first dosing event, wherein a pumping device transfers the reductant from a reductant source toward the dispensing device via a fluid passage;
    dispensing reductant from a chamber in a nozzle of the dispensing device into the exhaust stream through a plurality of injection passageways that open at one end into the chamber and at an opposite end into the exhaust stream;
    forcing reductant from the chamber of the nozzle toward the reductant source, wherein sufficient reductant remains in the pumping device to keep the pumping device primed.

2. The method of claim 1 further comprising:
    ordering a second dosing event;
    supplying a reductant to the dispensing device in response to ordering the second dosing event;
    dispensing reductant from the dispensing device into the exhaust stream, wherein forcing reductant from the dispensing device toward the reductant source is done between the first dosing event and the second dosing event.

3. The method of claim 2, wherein the engine is running at non-idle conditions when dispensing reductant from the dispensing device into the exhaust stream and when forcing reductant from the dispensing device toward the reductant source.

4. The method of claim 1, wherein the reductant is a urea solution.

5. The method of claim 1, wherein forcing reductant from the dispensing device toward the reductant source further comprises transferring pressurized gas to the dispensing device, the pressurized gas mixing with the reductant remaining in the dispensing device to form a purge flow.

6. The method of claim 5, wherein the purge flow is restricted from exiting into the exhaust system by a pressure differential formed in the injector.

7. The method of claim 1, wherein forcing reductant from the dispensing device toward the reductant source occurs when the temperature of the exhaust stream is higher than about 180° C.

8. The method of claim 1, wherein forcing reductant from the dispensing device toward the reductant source includes forcing reductant out of a predetermined hot zone proximate the dispensing device.

9. The method of claim 1, wherein supplying a reductant to a dispensing device includes supplying reductant in a first direction in the fluid passage and wherein forcing reductant from the dispensing device includes forcing reductant in a second direction through the fluid passage, the second direction being opposite to the first direction.

10. The method of claim 1, wherein the pumping device is on when dispensing reductant from the dispensing device and the pumping device is off when forcing reductant from the dispensing device toward the reductant source.

11. A method for dosing reductant into the exhaust stream of an engine, comprising
   supplying reductant from a pumping device to a dispensing device via a first fluid passage, the length of the first fluid passage from the pumping device to the dispensing device being a first length;
   spraying reductant from a chamber in a nozzle of the dispensing device into the exhaust stream through a plurality of injection passageways that open at one end into the chamber and at an opposite end into the exhaust stream; and
   forcing reductant from the chamber of the nozzle along the first fluid passage toward the pumping device;
   discontinuing forcing reductant along the first fluid passage when reductant from the dispensing device is a second length along the first fluid passage, wherein the second length is less than the first length.

12. The method of claim 11 wherein forcing reductant from the dispensing device further comprises supplying pressurized gas to the dispensing device via a second fluid passage.

13. The method of claim 12 wherein forcing reductant from the dispensing device further comprises deactivating the pumping device.

14. The method of claim 11 wherein the exhaust stream creates a hot zone proximate the dispensing device and wherein the second length corresponds to a location along the first fluid passage that is out of the hot zone.

15. The method of claim 11 wherein forcing reductant from the dispensing device along the first fluid passage toward the pumping device is accomplished between intermittent steps of spraying reductant from the dispensing device into the exhaust stream.

16. A reductant dosing system for an engine, comprising:
   a reductant source;
   a pumping device fluidly connected to the reductant source;
   a dispensing device that includes a chamber in a nozzle fluidly connected to the pumping device by a first fluid passage and configured to dispense reductant into an exhaust stream of the engine through a plurality of injection passageways that open at one end into the chamber and at an opposite end into the exhaust stream;
   a pressurized gas source fluidly connected to the dispensing device by a second fluid passage that opens at one end into the chamber;
   a control system configured to purge reductant from the dispensing device along the first fluid passage toward the pumping device with pressurized gas from the pressurized gas source between the dispensing device intermittently dispensing reductant into an exhaust system of the engine while maintaining sufficient reductant in the pumping device to keep the pumping device primed.

17. The reductant dosing system of claim 16 further comprising a bypass passage connecting the reductant source to the first fluid passage and a first valve configured to selectively direct a reductant from the first fluid passage to the reductant source.

18. The reductant dosing system of claim 17, further including a second valve associated with the second fluid passage, the second valve configured to selectively allow the pressurized gas from the pressurized gas source to flow to the dispensing device.

19. The reductant dosing system of claim 18, wherein to purge reductant from the dispensing device, the control system is configured to deactivate the pumping device, place the first valve in a first position that allows reductant to flow through the bypass passage, and place the second valve in a first position that allows pressurized gas from the pressurized gas source to flow to the dispensing device.

20. The reductant dosing system of claim 16 wherein the exhaust stream creates a hot zone proximate the dispensing device and wherein the control system is configured to purge reductant out of the hot zone between the dispensing device intermittently dispensing reductant into an exhaust system of the engine.

* * * * *